United States Patent [19]

Nakagawa

[11] Patent Number: 4,709,174

[45] Date of Patent: Nov. 24, 1987

[54] MAGNETIC POLE PIECES FOR USING IN LINEAR PULSE MOTOR

[75] Inventor: Hiroshi Nakagawa, Ise, Japan

[73] Assignee: Shinko Electric Co., Ltd., Tokyo, Japan

[21] Appl. No.: 732,416

[22] Filed: May 9, 1985

[30] Foreign Application Priority Data

May 10, 1984 [JP] Japan ................................. 59-93528
May 10, 1984 [JP] Japan ................................. 59-93529

[51] Int. Cl.$^4$ ............................................ H02K 41/00
[52] U.S. Cl. ..................................................... 310/12
[58] Field of Search ................................... 310/12–14; 318/135

[56] References Cited

U.S. PATENT DOCUMENTS

4,578,622  3/1986  Nakagawa et al. ................ 310/12 X

Primary Examiner—Donovan F. Duggan
Attorney, Agent, or Firm—Kane, Dalsimer, Kane, Sullivan and Kurucz

[57] ABSTRACT

A magnetic pole piece for use in a linear pulse motor which includes: a primary magnetic flux generating unit composed of a pair of cores each having a coil wound around them and pairs of magnetic pole pieces, each magnetic pole piece being provided at either end portion of a corresponding core; and a scale having a row of first teeth formed therein along a direction of relative travel thereof with respect to the magnetic flux generating unit, and scale and the flux generating unit being disposed so that the scale relatively moves with respect to the primary magnetic flux generating unit by generating magnetic flux in gaps formed between the magnetic poles and first teeth facing to the magnetic poles, the pole pieces each including the flat magnetic pole piece member having a head portion and a leg portion and are arranged on a plane with each head portion disposed close to head portions of adjacent pole piece members. The head portions of the adjacent pole piece members are integrally connected by a connecting portion having a small cross-sectional area.

4 Claims, 17 Drawing Figures

MAGNETIC POLE PIECES FOR USING IN LINEAR PULSE MOTOR

BACKGROUND OF THE INVENTION

The present invention relates to a magnetic pole piece for use in a linear pulse motor.

Linear pulse motors provide high performance as reciprocally movable actuator and hence are widely used for feeding devices in various information peripheral devices such as head feeding devices of the electronic printer and photoelectronic reader. Recently there is a strong need for reduction in dimensions and cost of the linear pulse motor as office automation terminals are being reduced in volume and cost. In addition to these requirements reduction in thickness is required for the pulse motor used for feeding the head of the floppy disc drive.

In view of these requirements, the inventor proposed as a coinventor a flat-type linear pulse motor in U.S. Pat. No. 4,578,622 (filed: Oct. 20, 1983) entitled "LINEAR PULSE MOTOR", corresponding to Japanese Patent Applications Nos. 57-188843, 57-198658 and 58-220238, of which disclosure is hereby incorporated by reference. In this flat-type linear pulse motor, magnetic pole teeth are formed in the pole piece members. Although this flat-type linear pulse motor fairly meets the requirements of reducing volume and thickness thereof, but it is in practice rather hard to form very small pole teeth in the pole piece members.

Figure 1:
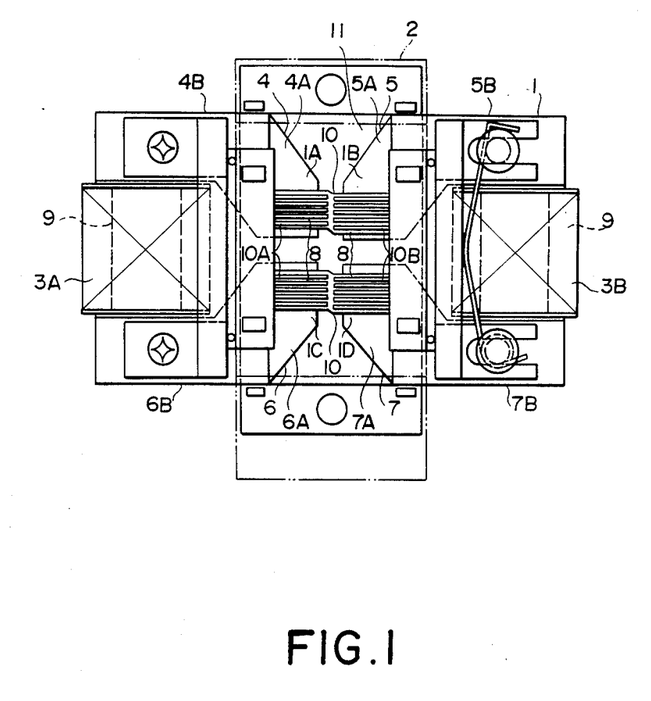
FIG. 1 illustrates a linear pulse motor proposed in a copending U.S. patent application.
Figure 2:
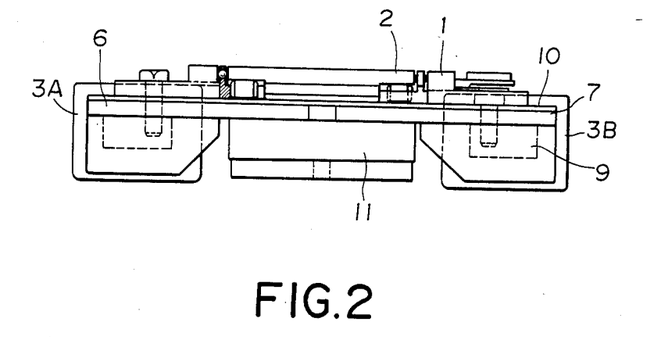
FIG. 2 is a front view of the linear pulse motor in FIG. 1.
Figure 3:
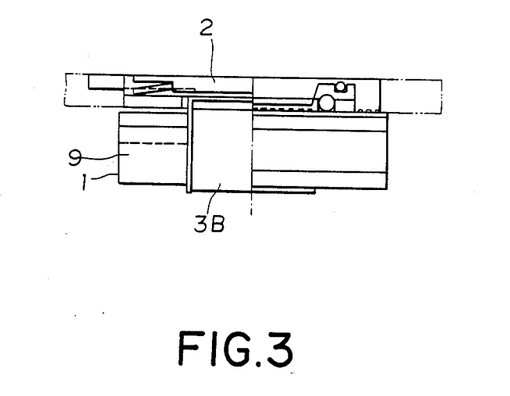
FIG. 3 is a side view, partly in section, of the linear pulse motor in FIG. 1.
Figure 4:
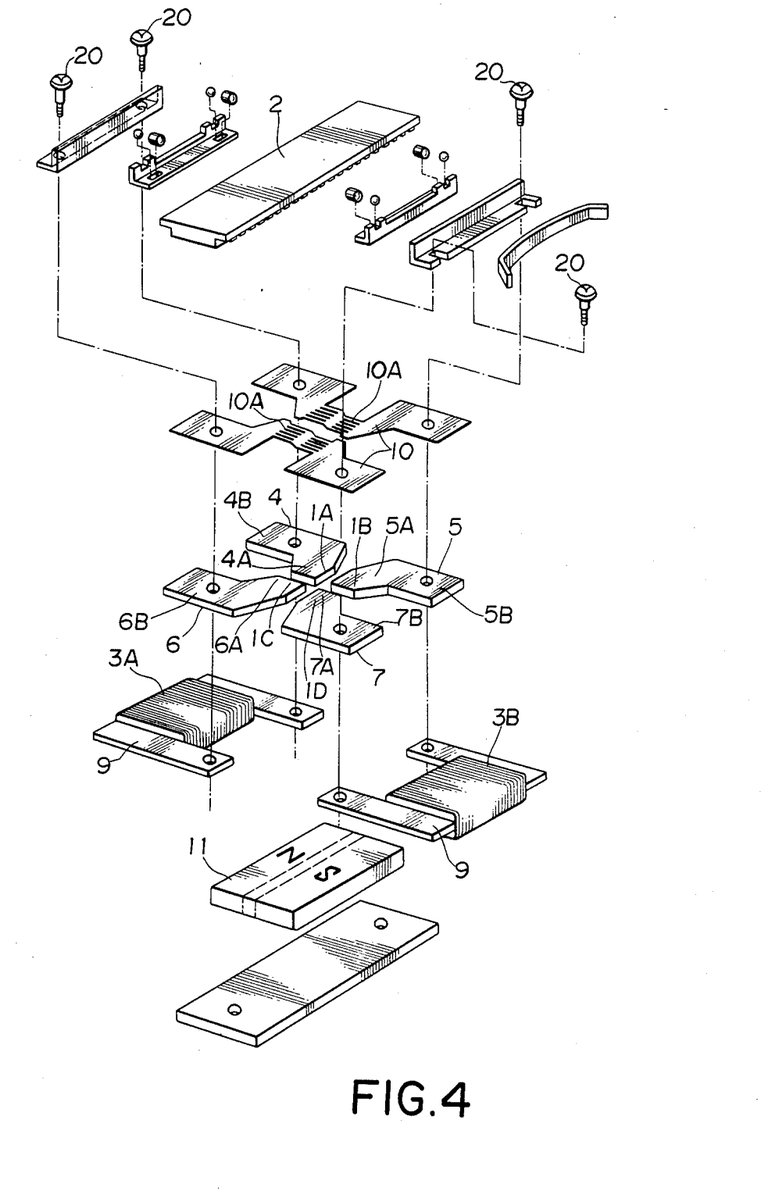
FIG. 4 is an exploded view of the linear pulse motor in FIG. 1.

To overcome this drawback the inventor proposed, as a coinventor, a linear pulse motor in a concurrently-filed U.S. patent application, (inventors: Hiroshi NAKAGAWA and Chuzo YAMANISHI) entitled "LINEAR PULSE MOTOR" and corresponding to Japanese Patent Application No. 59-93531 filed on May 10, 1984. The disclosure of this U.S. patent application is incorporated herein by reference. Referring to FIGS. 1–7, there is illustrated this linear pulse motor which includes a primary magnetic flux generating device 1, having four magnetic poles 1A, 1B, 1C and 1D, and a secondary scale 2 linearly movably supported on the magnetic flux generating device 1. This linear pulse motor is operated in the same operating principle as the linear pulse motor disclosed in U.S. patent application Ser. No. 543,927. As clearly shown in FIG. 4, flat magnetic pole members 4–7 are used for magnetic poles 1A, 1B, 1C and 1D. Magnetic pole members 4–7 include head portions 4A, 5A, 6A and 7A and leg portions 4B, 5B, 6B and 7B integrally formed with the head portions 4A, 5A, 6A and 7A, respectively. The magnetic pole members 4–7 substantially have a L shape. The leg portions 4B–7B are attached through machine screws 20 to corresponding yoke members 9 around each of which is wound a coil 3A or 3B. The magnetic pole members 4–7 are disposed in a plane to substantially form in a X shape, as shown in FIG. 1, with the head portion 4A–7A disposed close to each other. Each pair of pole pieces 4,6 or 5,7 has coil 3A or 3B disposed between legs thereof. Pole teeth 8 of each magnetic pole are formed by bonding to the upper surfaces of the corresponding magnetic pole piece members 4,5 or 6,7 a thin ferromagnetic plate 10 having slits 10A formed through it at a predetermined pitch. The thin plate 10 may be an iron plate having typically a thickness from about 0.1 to 0.5 mm. For such a thin plate each slit 10A have a width about 0.3 mm and each land portion 13, which is formed by the slits 10A and serve as pole teeth, have a width about 0.2 to 1 mm. Each plate 10 is provided with a pair of L-shaped portions 16 and 17 or 18 and 19 (FIG. 5) bonded by adhesive such as epoxy resin to corresponding pole piece members 4 and 5 or 6 and 7. A permanent magnet 11 having specific polarity is bonded to the lower faces of the magnetic pole pieces 4–7 to be magnetically coupled to magnetic poles 1A, 1B, 1C and 1D.

Figure 5:
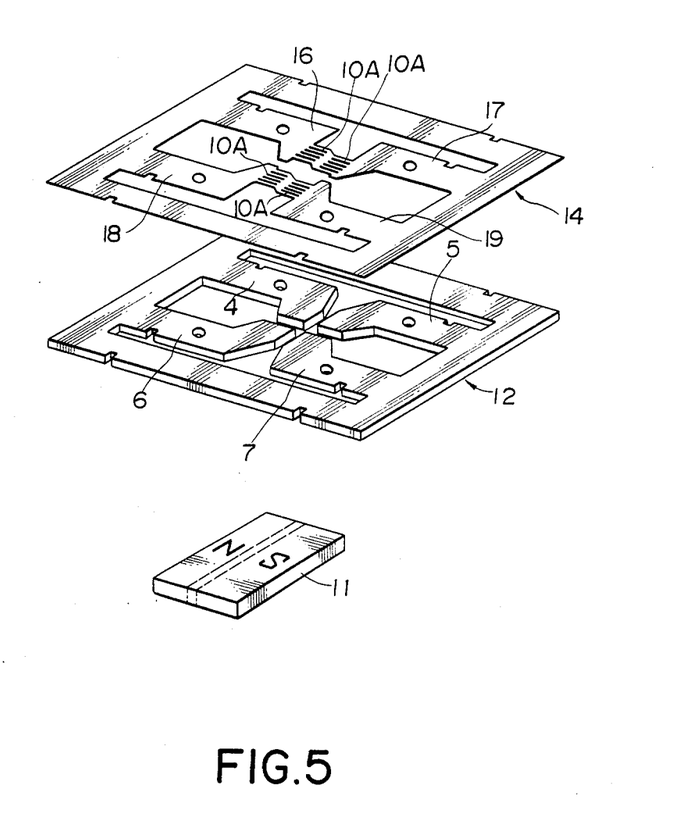
FIG. 5 is a perspective view of a slit plate blank, a pole piece blank and the permanent magnet of the linear pulse motor in FIG. 1.
Figure 6:
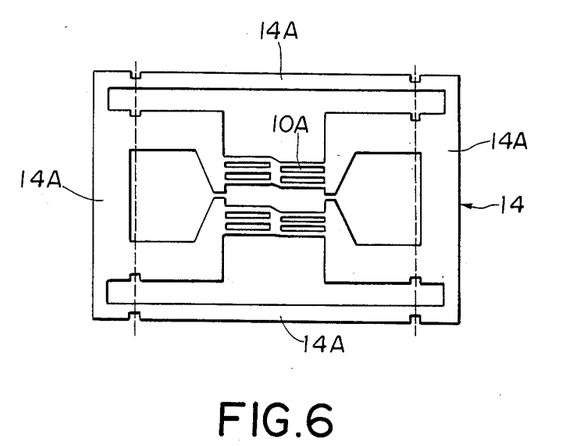
FIG. 6 is a plan view of the slit plate blank in FIG. 5.
Figure 7:
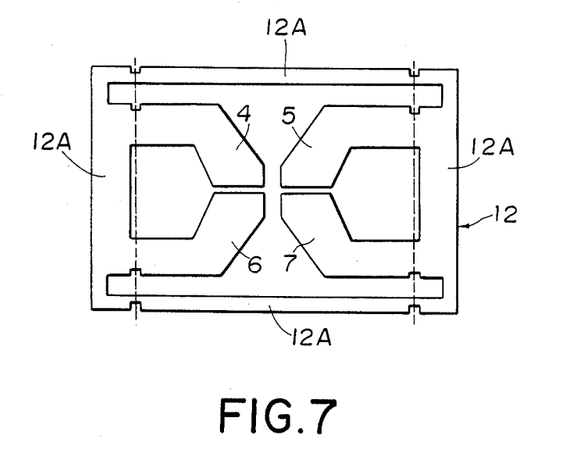
FIG. 7 is a plan view of the pole piece blank in FIG. 5.

In manufacturing the above-mentioned magnet flux generating device 1, a pole piece blank 12 is previously formed, in which the four magnetic pole members 4–7 are, as shown in FIG. 5, integrally formed so that they are disposed at relative positions at which they are to be assembled later to form the magnetic poles. Further, a thin plate blank 14 having two thin plates 10 integrally formed with it is prepared. Each thin plate 10 has two portions corresponding to the head portions 4A, 5A or 6A, 7A of the pole pieces and provided with slits 10A at predetermined pitch. The thin plate blank 14 is bonded to the pole piece blank 12 to form a bonded assembly, which is then attached to the permanent magnet 11 by bonding the latter to the lower face of the pole piece members 4–7 of the pole piece blank 12. Thereafter, unnecessary connecting portions 12A of the pole piece blank 12 and unnecessary connecting portions 14A of the thin plate blank 14 are cut off by cutting along the broken lines shown in FIGS. 6A and 6B.

This process of manufacture enables easy and accurate relative positioning of the pole piece members 4–7. However, when the connecting portions 12A and 14A are cut off, there is a possibility that excess stress is produced in the pole teeth and the bonding layer, thus resulting in separation of the bonded parts and in deformation of the slit plate 10. Further, the cutting off of the connecting portions 12A and 14A is rather laborious and reduces yield of the magnetic poles.

SUMMARY OF THE INVENTION

Accordingly, it is an object of the present invention to provide a magnetic pole piece which eliminates the cutting of the connecting portions of pole pieces, thus overcoming the drawbacks above mentioned due to this cutting operation while maintaining easy and accurate positioning of the pole pieces.

With this and other object in view, the present invention provides magnetic pole piece for use in a linear pulse motor which includes: a primary magnetic flux generating unit composed of a pair of cores each having a coil wound around them and pairs of magnetic pole pieces, each magnetic pole piece being provided at either end portion of a corresponding core; and a scale having a row of first teeth formed therein along a direction of relative travel thereof with respect to the magnetic flux generating unit, the scale and the flux generating unit being disposed so that the scale relatively moves with respect to the primary magnetic flux generating unit by generating magnetic flux in gaps formed between the magnetic poles and first teeth facing to the magnetic poles, the pole pieces each including the flat magnetic pole piece member having a head portion and a leg portion and are arranged on a plane with each head portion disposed close to head portions of adjacent pole piece members. The head portions of the adjacent pole piece members are integrally connected by a connecting portion having a small cross-sectional area.

DETAILED DESCRIPTION OF THE PREFERRED EMBODIMENTS

Figure 8:
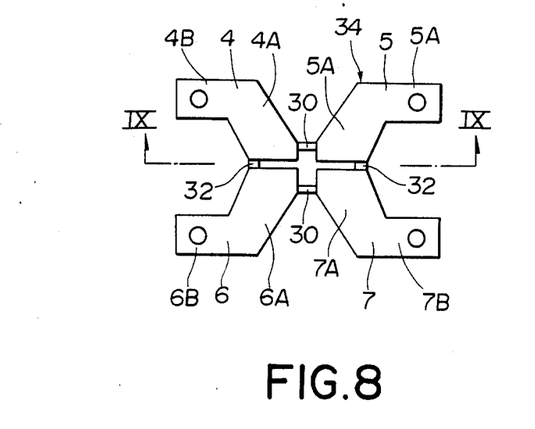
FIG. 8 is a plan view of a yoke according to the present invention.
Figure 9:
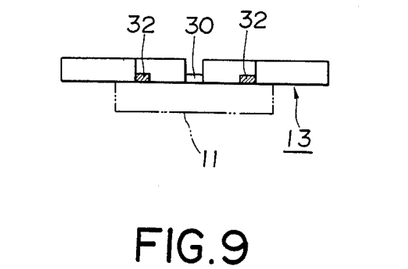
FIG. 9 is a cross-sectional view taken along the line IX—IX in FIG. 8.
Figure 10:
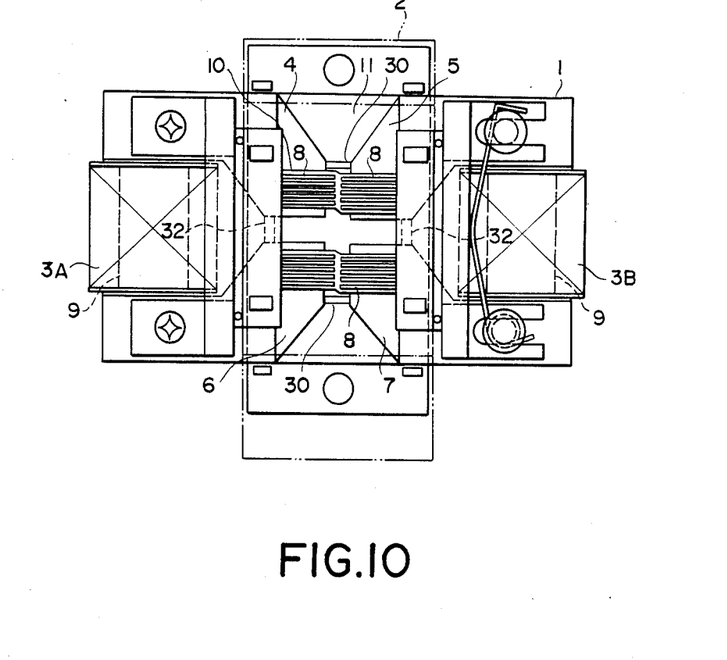
FIG. 10 is a plan view of a linear pulse motor using the yoke in FIG. 8.

Referring to FIGS. 8, 9 and 10, there is illustrated one embodiment of the present invention, in which similar parts are designated by same or like reference numerals and explanation thereof is omitted.

In this embodiment, the pole piece members 4–7 are integrally connected at their head portions 4A, 5A, 6A and 7A to adjacent pole piece members by connecting members 30 and 32 so that they are arranged in a plane so as to be located in assemblage positions as shown in FIG. 10. The pole piece members 4–7 thus integrated constitutes a yoke member 34.

The connecting portions 30 and 32 have thickness smaller than the head portions 4A–7A and are provided to edges of the head portions 4A–7A to be, as shown in FIG. 9, continuous with lower faces thereof which are to be bonded to the permanent magnet 11. Typically, the yoke member 34 is about 5 cm long, about 3 cm wide and about 2 mm thick while the connecting portions 30 and 32 are about 2 mm wide and about 1 mm thick. The connecting portions 30 and 32 are set to have a cross-sectional area, in this embodiment 2 mm$^2$, such that reduction in thrust of the linear pulse motor due to magnetic flux leakage through the connecting portions is within an allowable limit.

Such a yoke member 34 is formed by press working a plate blank to form the connecting portions 30 and 32 of a predetermined thickness and then by punching out the yoke. Instead of press working, machining, etching, etc. may be adopted for making the yoke member 34.

The yoke member 34 thus formed is bonded at its lower face to the permanent magnet 11, and then assembled to other components as shown in FIG. 10, in which event there is no inconvenience for attaching the yoke member 34 to the magnetic coils 3A, 3A and other components. The provision of the connecting portions 30 and 32 dissipates residual magnetization at once in demagnetization mode, and hence stepwise motion of the linear motor is smoothly carried out. Although the connecting portions 30 and 32 are located near the slit plates 10 as shown in FIG. 10, the provision of the connecting portions 30 and 32 gives no large increase in magnetic flux leakage because they are small in thickness and because they are disposed close to the permanent magnet 11 and to be remote from the pole teeth 8 which are provided on the opposite side of the yoke member 34 relative to the permanent magnet 11. Thus, the connecting portions 30 and 32 do not give in practice any substantial adverse affect on the performance of the linear pulse motor.

Figure 11:
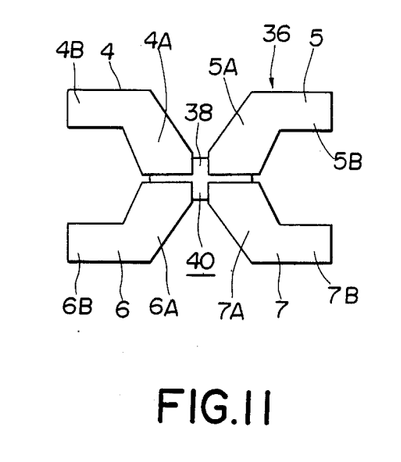
FIG. 11 is a plan view of a modified form of the yoke in FIG. 8.

Instead of the connecting portions 30 and 32, the head portions 4A–7A may be, as shown in FIG. 11, connected by a cross-shaped connecting member 38, the cross-shaped connecting portion 38 and edges of the head portions 4A–7A defining a cross-shaped groove 40. Alternatively, the connecting portions 30 and 32 may be in the shape of arcuate rods 44 and 46 as shown in FIG. 12.

Figure 15:
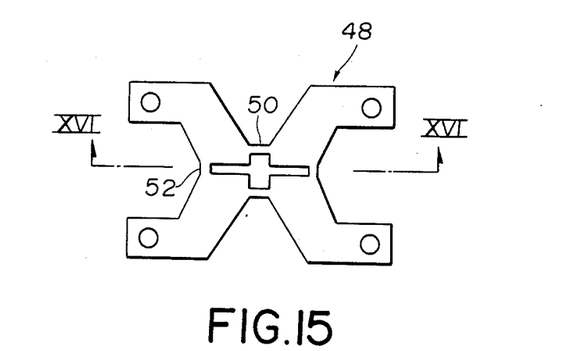
FIG. 15 is a plan view of a modified form of the yoke in FIG. 8.
Figure 16:
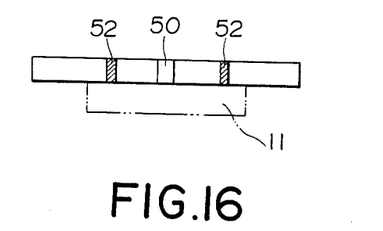
FIG. 16 is a cross-sectional view taken along the line XVI—XVI in FIG. 15.

FIGS. 15–16 illustrate a modified form of the yoke member 34. This modified yoke member 48 is distinct from the yoke member 34 in that the heads 4A–7A of adjacent pole piece members 4–7 are connected by narrow connecting members 50 and 52 which may have the same thickness as the pole piece members but may have substantially the same cross-sectional area as the connecting portions 30 and 32 of the yoke member 34. That is, the connecting members 50 and 52 are 1 mm wide and 2 mm thick for 5 cm × 3 cm × 2 mm yoke 48. Also, such connecting portions 50 and 52 do not give any substantial adverse affect on the performance of the linear pulse motor.

Figure 12:
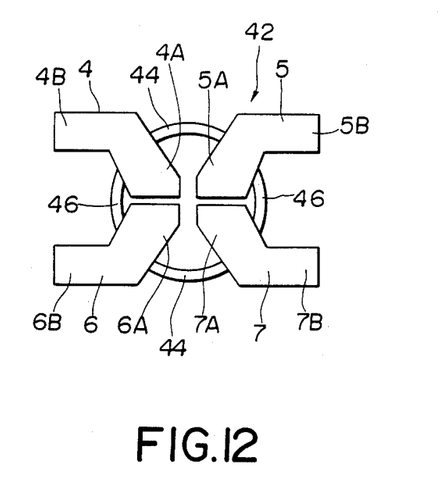
FIG. 12 is a plan view of a further modified form of the yoke in FIG. 8.
Figure 17:
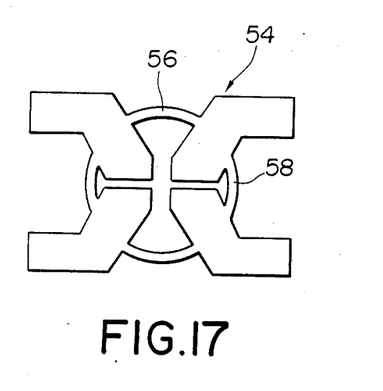
FIG. 17 is a plan view of a modified form of the yoke in FIG. 12.

Also, the yoke member 42 shown in FIG. 12 may be modified into a yoke member 54, shown in FIG. 17, including connection portions 56 and 58 having the same thickness as the pole piece members 4–7 but having substantially the same cross-sectional area as the connecting portions 44 and 46 of the yoke member 42.

Figure 13:
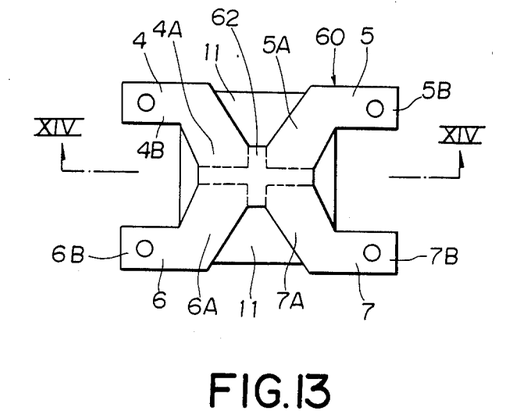
FIG. 13 is a plan view of another embodiment of the present invention.
Figure 14:
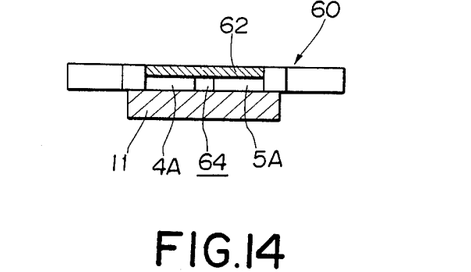
FIG. 14 is a cross-sectional view taken along the line XIV—XIV in FIG. 13.

Another embodiment of the present invention is shown in FIGS. 13 and 14, in which similar parts are designated by the same or like reference characters and explanation thereof is omitted. In this embodiment, head portions 4A–7A of the adjacent pole piece members 4–7 are integrally connected by a cross-shaped connecting member 62 to form a yoke member 60. The connecting portion 62 is smaller in thickness than the pole piece members 4–7 and is provided to be flush with the upper surfaces of the pole piece members 4–7 and to be remote from the lower faces of the latter to which the permanent magnet 11 is bonded, thus defining a cross-shaped groove 64 between the lower face of the cross-shaped connecting member 62 and edges of the head portions 4A–7A of the pole piece members 4–7.

Such a yoke 60 is easily formed by press working, that is, by pressing a blank to form the cross-shaped groove 64 and by punching out the outer shape of the yoke 60. The forming of the cross-shaped groove 64 may be also formed by machining, etching, or other conventional processing.

The permanent magnet 11 is bonded to the lower face of the yoke 60 and then the connection portion 62 is cut off. This cutting operation is easy since the connecting portion 62 is relatively thin. Furthermore, in cutting the connecting portion 62 there is little possibility of a grindstone contacting the very hard permanent magnet 11 (ferrite magnet) and being thereby broken since the groove 62 exists between the connecting portion 62 and the magnet 11 as clearly shown in FIG. 14. Then, the thin plates 10 are bonded to the pole piece members 4-7 thus cut off. When assembled, the pole piece members 4-7 are separately disposed as shown in FIG. 1.

What is claimed is:

1. In a magnetic pole piece for use in a linear pulse motor comprising: a primary magnetic flux generating unit comprising a pair of cores each having a coil wound therearound and pairs of magnetic pole pieces, each magnetic pole piece being provided at either end portion of a corresponding core; and a scale having a row of first teeth formed therein along a direction of relative travel thereof with respect to the magnetic flux generating unit, the scale and the flux generating unit being disposed so that the scale relatively moves with respect to the primary magnetic flux generating unit by generating magnetic flux sequentially in gaps formed between the magnetic poles and first teeth facing to the magnetic poles, the pole pieces each including the flat magnetic pole piece member having a head portion and a leg portion and are arranged on a plane with each head portion disposed close to head portions of adjacent pole piece members, the improvement wherein head portions of the adjacent pole piece members are integrally connected by a connecting portion having such a small cross-sectional area that no substantial adverse affect is imparted on the performance of the linear pulse motor.

2. A magnetic pole piece as recited in claim 1, wherein the connecting portions have a thickness smaller than the head portions of the pole piece members and each connecting portion is formed to be close to one faces of the corresponding head portions and remote from the other faces to which a plurality of parallel pole teeth are provided at predetermined pitch to face the teeth of the scale.

3. A magnetic pole piece as recited in claim 2, further comprising a thin ferromagnetic plate bonded to the other faces of the head portions, the thin plate having pole teeth portions formed therein to correspond to the head portions and each including the pole teeth.

4. A magnetic pole piece as recited in claim 2, wherein the connecting portions form a integral cross shape to thereby define a cross-shaped groove between the connecting portions and the head portions.

* * * * *